United States Patent [19]

Davis

[11] 4,215,809
[45] Aug. 5, 1980

[54] PIPE WELDING APPARATUS

[75] Inventor: Danny L. Davis, Houma, La.

[73] Assignees: Salvatore Panzeca, New Orleans; Michael Badalamenti, Houma; Carlo Montalbano, New Orleans, all of La.; part interest to each

[21] Appl. No.: 961,888

[22] Filed: Nov. 17, 1978

[51] Int. Cl.² .................. B23K 9/04; B23K 37/02
[52] U.S. Cl. ........................ 228/48; 228/45; 228/119; 219/76.14
[58] Field of Search .............. 228/48, 45, 119; 219/76.14; 82/46 R, 47, 48, 100, 21 B

[56] References Cited

U.S. PATENT DOCUMENTS

| | | | |
|---|---|---|---|
| 2,295,702 | 9/1942 | Wissler | 219/76.14 X |
| 2,912,562 | 11/1959 | Donovan | 219/76.14 X |
| 3,254,192 | 5/1966 | Braacht | 219/76.14 |
| 3,634,648 | 1/1972 | Morris et al. | 228/48 X |

*Primary Examiner*—Milton S. Mehr
*Attorney, Agent, or Firm*—Clarence A. O'Brien; Harvey B. Jacobson

[57] ABSTRACT

The apparatus resurfaces the interior of a tubular pipe or other constant radius cylindrical structure by depositing a series of contiguous, coaxial weld beads on the surface of the structure. The apparatus comprises a chuck for holding and rotating the structure to be resurfaced while a weld head is positioned within a free end of the structure. Upon each 360 degree rotation of the structure, the weld head deposits a continuous circular bead on the structure surface and upon the completion of each bead, the head is moved a predetermined increment axially within the structure whereupon a further bead is drawn in a similar manner.

1 Claim, 6 Drawing Figures

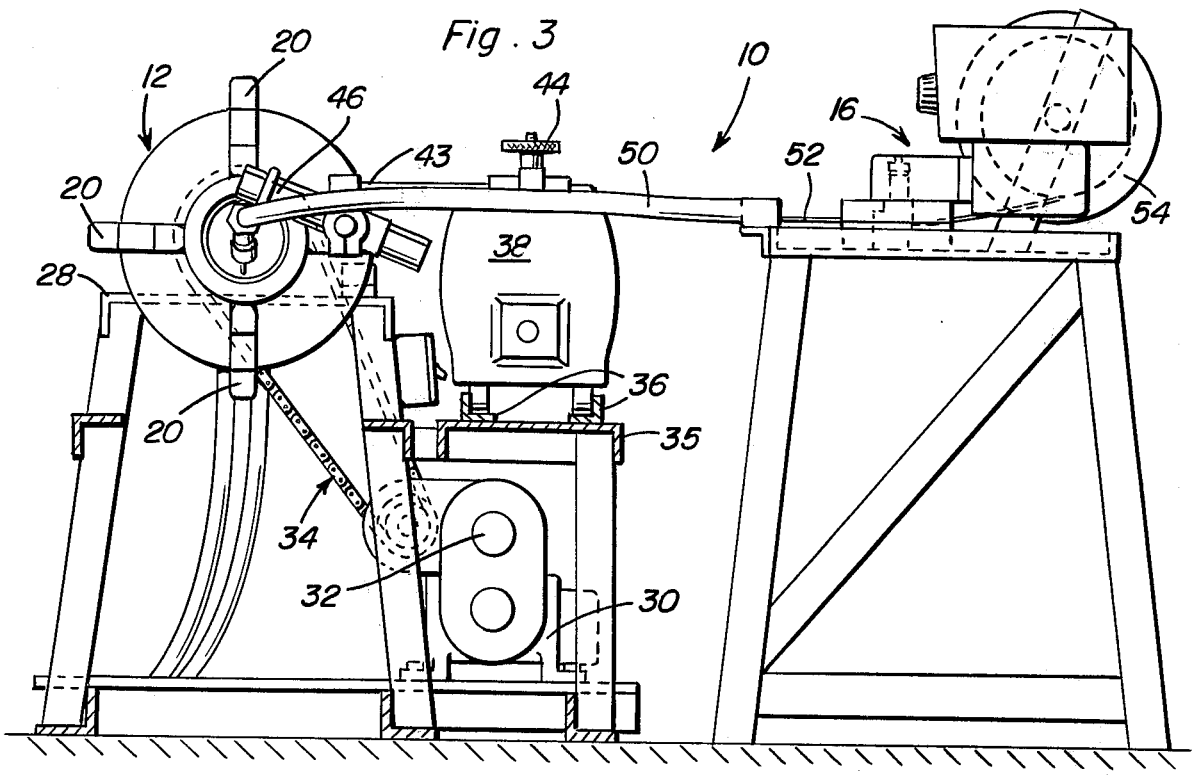
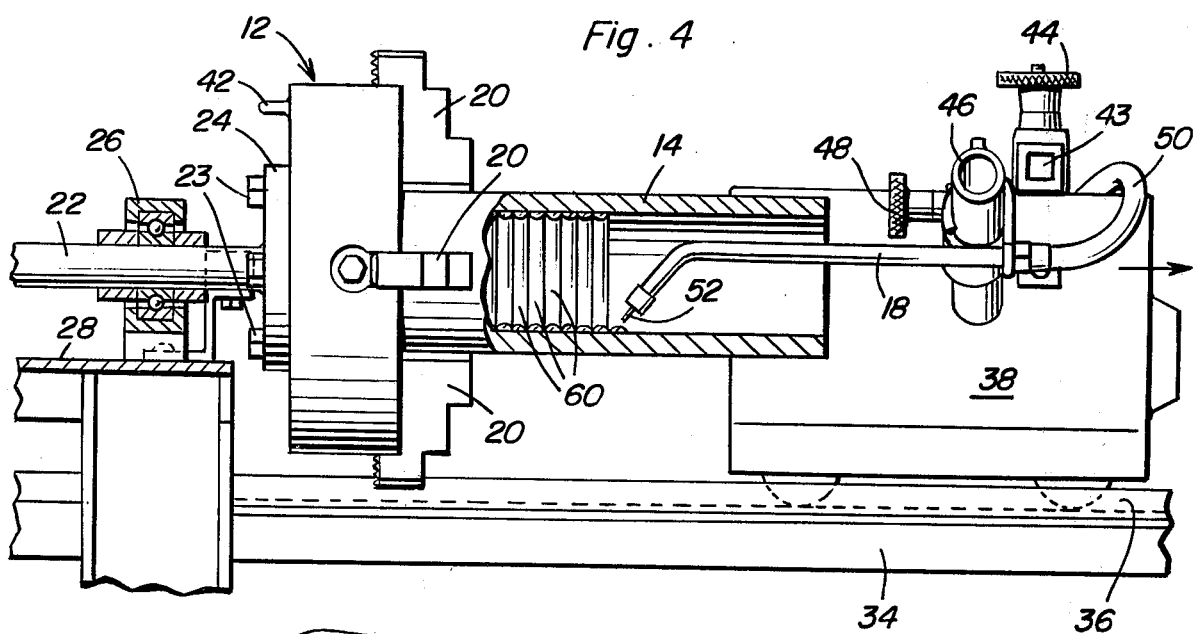
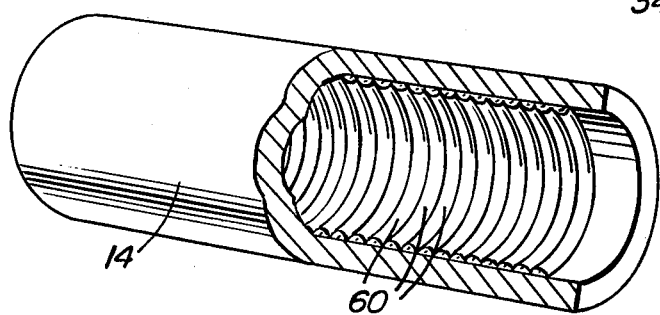

PIPE WELDING APPARATUS

BACKGROUND OF THE INVENTION

1. Field of the Invention

This invention relates to welding apparatus and especially to such apparatus designed for resurfacing the interior of pipe having a relatively small diameter.

2. Description of the Prior Art

In many fields of endeavor, it is desirable to rebuild old structural components in lieu of the purchase of expensive new components. In the oil business especially, it is desirable to repair deteriorated items such as the stuffing boxes used in well drilling rigs and well pumps, as the major structural integrity of these elements is maintained and only the inner peripheral surface becomes worn and unusable. The present procedure for effecting such repairs calls for a manual welding operation in which the welder must toil for some nine hours in order to insure that the entire peripheral surface of the stuffing box is rebuilt with a quality weld. There has, therefore, developed a demand for a welding apparatus which will perform this function quickly, effectively and economically.

However, due to the nature of the structure to be welded, stuffing boxes normally have a length of approximately 14 inches with an internal diameter of approximately 4 inches, conventional welding machines and techniques are inappropriate in that they either are too cumbersome to fit within the confines of the stuffing box or are so complex as to destroy the economic benefit derived from resurfacing of the stuffing boxes. Among the prior art welding machines, are included certain machines designed to weld internally of the hollow structures. Examples of such machines include U.S. Pat. No. 3,009,048, issued Nov. 14, 1961 to Stanley, and U.S. Pat. No. 3,817,400, issued June 18, 1974 to Bartley. Each of these patents discloses a welding machine which is disposed in its entirety within the confines of a hollow structure to be welded. The welding machine is movable axially within the structure and the welding head is rotatable through an arc along the inner periphery of the structure. A machine such as this is not amenable to use within the confines of small pipes or stuffing boxes. Each of U.S. Pat. Nos. 4,068,791, issued Jan. 17, 1978 to Scholtus et al, and 3,769,486, issued Oct. 30, 1973 to Braucht shows a welding apparatus in which the head of a welding machine is insertable within a hollow structure. The head is disposed for movement axially within the structure as well as attached for rotation about the circumference of the internal surface of the structure. Devices such as these require complex mechanical linkages in order to insure the proper totality of movement of the welding head necessary to effect a smooth, clean weld. Also, due to the complexity of the head movement linkages, it is customary to utilize a sensing device in order to maintain a proper distance between the welding electrode and the surface being welded. The devices disclosed in U.S. Pat. Nos. 3,084,243, issued Apr. 2, 1963 to Gotch, 3,020,388, issued Feb. 6, 1962 to Elliott, 3,582,599, issued June 1, 1971 to Yohn, and 3,437,787, issued Apr. 8, 1969 to Chyle are welding devices designed to produce a single bead axially of a pipe in the pipe wall. Thus, none of these devices would be suitable for producing a continuous deposit of weld material on the internal surface of a pipe. In like manner, the devices disclosed in U.S. Pat. No. 3,424,877, issued June 28, 1969 to Fehlman, and U.S. Pat. No. 1,846,470, issued Feb. 23, 1932 to Burnish will be unable to deposit a layer of weld material on the internal surface of a pipe as each of these patents discloses a welding device designed to produce a single circular weld on the inner periphery of a pipe and no axial movement of the weld head is contemplated.

SUMMARY OF THE INVENTION

A primary goal of the present invention is to provide an apparatus whereby the interior of a hollow structure having a constant radius may be resurfaced by covering it with a continuous layer of weld material.

In furtherance of this goal, it is an additional object of the present invention to provide a welding apparatus whereby the internal surface of a hollow structure may be welded by the insertion therein of a minimal number of components such that hollow structures having small diameters may be effectively resurfaced.

A further object of the present invention is to provide a welding apparatus whereby relative rotational motion between the weld head and structure to be welded is effected through rotation of a chuck holding the structure to be welded.

A still further object of the present invention is to provide a welding apparatus whereby the relative axial translation necessary to accomplish the primary objective is provided by attachment of the weld head to a movable platform which travels parallel to the axis of the structure to be welded.

One still further object of the present invention is to provide a welding apparatus which can be used without modification to weld the external surface of a constant radius tube or shaft.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an elevational sectional view taken substantially along a plane passing through section line 3—3 of FIG. 1.

FIG. 4 is an elevational part sectional view taken substantially along a plane passing through section line 4—4 of FIG. 2 and showing the relation of the welding head to the structure being welded.

FIG. 6 is a part sectional view showing a completed continuous weld as produced by the welding apparatus.

DESCRIPTION OF THE PREFERRED EMBODIMENT

Figure 1:
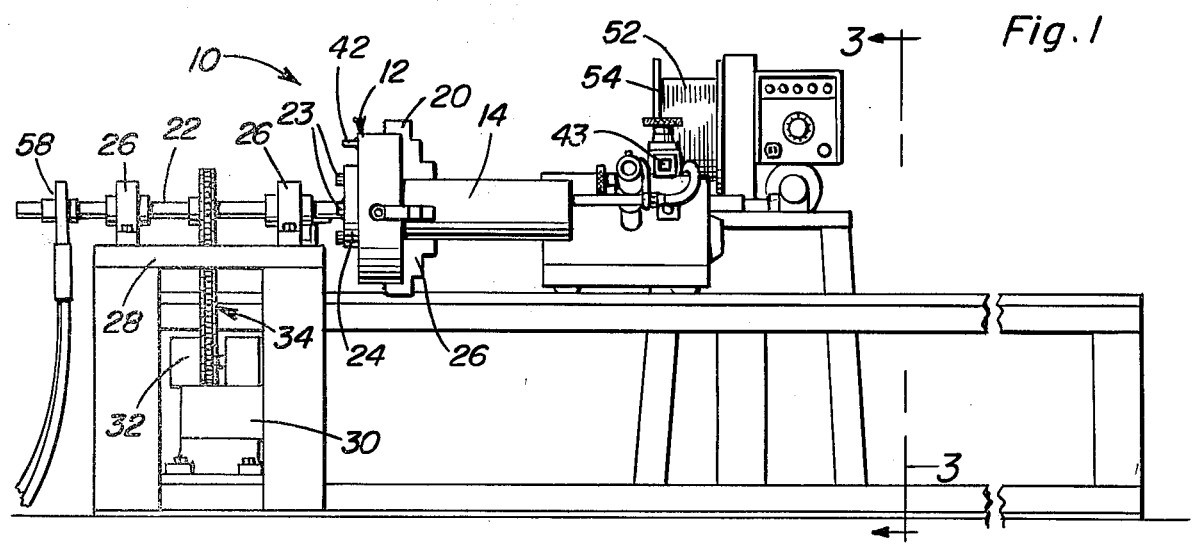
FIG. 1 is an elevational view of the welding apparatus of the present invention shown in operation.
Figure 2:
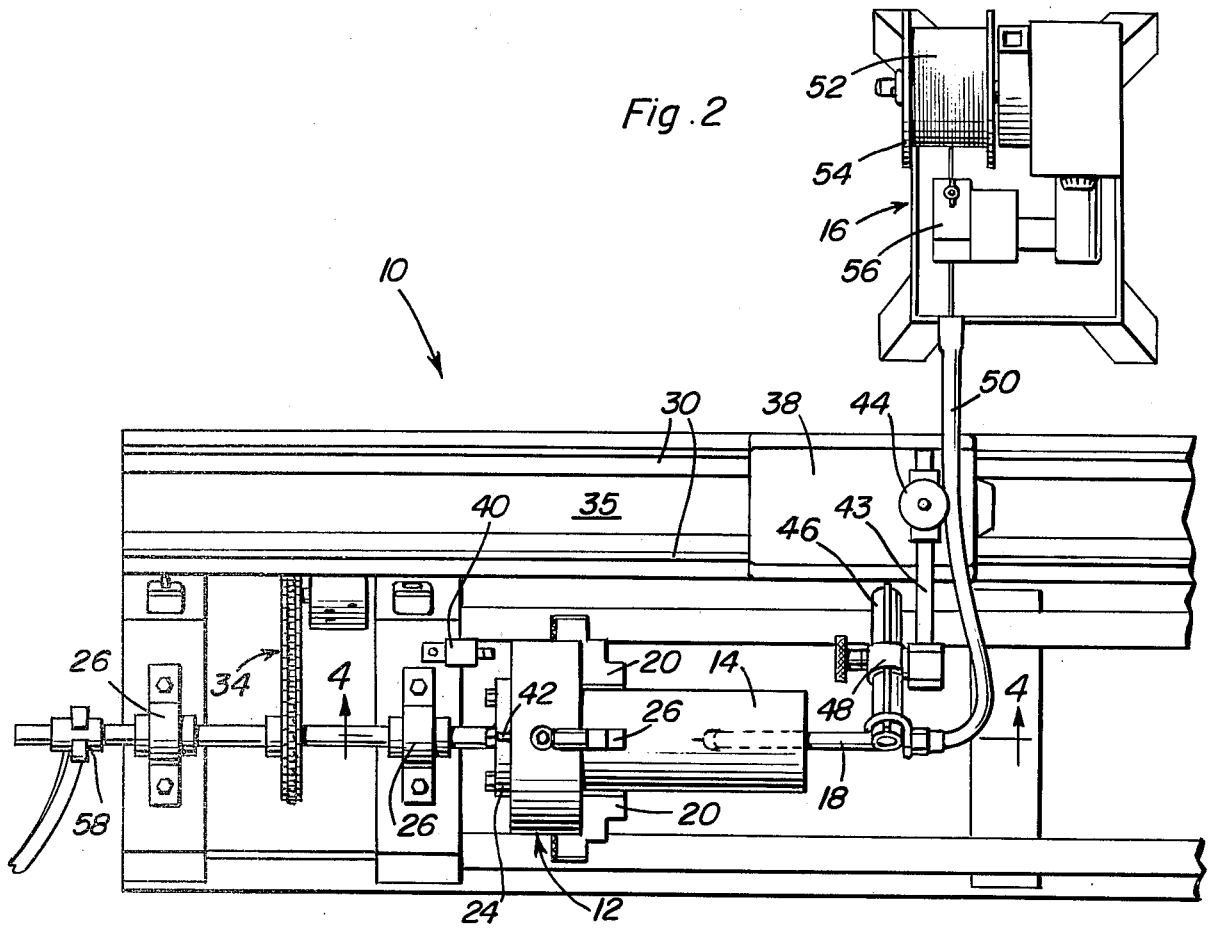
FIG. 2 is a plan view of the welding operation of the present invention shown in operation.
Figure 5:
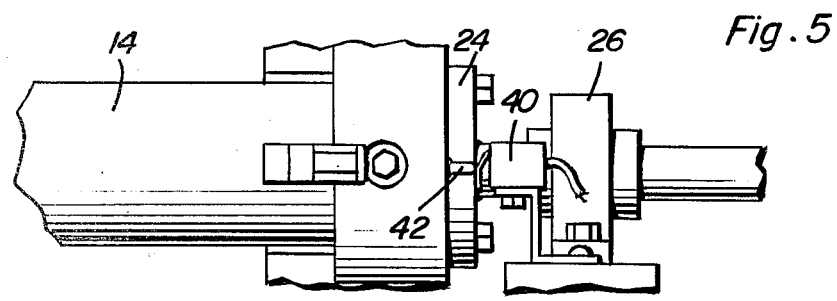
FIG. 5 is a detailed view showing the placement of the cam and switch mechanism of the invention.

Now with reference to the drawings, the welding apparatua generally referred to by the numeral 10 will be set forth in detail. The welding device comprises three major components. Chuck 12 holds the structure to be welded, which in this case consists of pipe section 14. Arc welder 16 provides current and weld materal to welding head 18, which is inserted into pipe 14. Carriage 38 carries the welding head 18 and functions to move the weld head axially of pipe section 14.

The chuck 12 may be choosen as desired to accommodate the specific structure being welded. Specifically shown in the drawings, is a chuck having four jaws 20 of conventional design for engaging the pipe section 14. The chuck is attached to shaft 22 by any suitable means, but is shown in the drawings to be attached by the use of bolts 23 which extend through flange 24 and threadedly engage the body of chuck 12. In this manner, the chuck may be quickly and easily exchanged for any other desired chuck. The flange 24 is fixedly connected to shaft 22. The shaft 22 is supported and journaled by pillow block bearings 26 which are in turn mounted to support base 28. Rotation of the chuck 12 is produced by motor 30 which drives the shaft through a reduction gear mechanism 32 and the attached chain and sprocket drive 34. In actual practice, the motor speed and gear ratios are chosen such that the chuck speed may be varied from about one to ten revolutions per minute. This speed constitutes the preferred operating angular velocity range for the chuck.

A second support base 35 is attached to and supports a pair of tracks 36 which extend parallel to the axis of rotation of shaft 22. These tracks support and guide a motorized carriage 38. Carriage 38 may be that used in a conventional cutting machine such as is sold by the Linde Company. Carriage 38 is activated in response the closing of a switch 40 mounted in a stationary position to the rear of chuck 12. Once per revolution, switch 40 is activated by cam 42 which is mounted on chuck 12 for rotation therewith. Upon activation of switch 40, a one second pulse of current is sent to carriage 38. This causes carriage 38 to advance on tracks 36 a distance of approximately ¼-½ inch or a suitable distance approximately equal to the width of the weld bead being produced.

Carriage 38 has a laterally extending arm 43 attached thereto. This arm is adjustable with respect to carriage 38 by tightening or loosening knurled wheel 44. Attached to lateral arm 43 is a rotatable arm 46 which is adjustable by loosening knurled wheel 48. Arm 46 carries the weld head 18 which is attached by a flexible tubing 50 to the arc welder 16. Arms 43 and 46 allow sufficient adjustment of the weld head 18 so that the head may be moved vertically or horizontally within the pipe 16. Also, if desired, the welding head may be positioned on the external surface of pipe 16 for covering that surface with weld material.

Arc welder 16 is a standad automatic arc welder such as that sold by the Linde Company under the designation Mig-39/116. The welder has a supply of welding electrode 52 which is coiled upon spool 54 and is fed through feed mechanism 56 into tubing 50 and welding head 18. Arc welder 16 is an amperage controlled device which automatically feeds the proper amount of welding electrode based on the amperage selected. Arc welder 16 is also connected to ground clamp 58 which forms the ground path for the current through pipe 14, chuck 12, and shaft 22. Furthermore, the arc welder may be provided with any other conventional welding features. For instance, in automatic consumable electrode welding such as this, it is common to provide an inert gas atmosphere about the electrode being consumed. The channeling of this gas normally takes place through the welding head 18, but has been omitted here for purposes of clarity.

In operation, a workpiece, such as pipe 14, is placed in chuck 12 and the chuck is then rotated so that cam 42 is just slightly beyond switch 24. The controls of arc welder 16 should be set to the desired settings. For a 4-inch diameter pipe, these would consist of a voltage between 24 and 30 volts and a current setting between 160 and 170 amperes. The chuck speed should be set at approximately 1 RPM. The welding head 18 is then set such that the tip is just barely above the inner surface of pipe 14 and carriage 38 is set at its initial starting position with the welding head at the end of the workpiece nearest the chuck. The arc welder 16 and chuck 12 are then put into operation. In this manner, a first bead 60 as shown in FIGS. 4 and 6 is drawn about the inner circumference of pipe 14. Upon cam 42 actuating switch 40, carriage 38 is advanced by approximately ¼ inch while chuck 12 continues to rotate and a second bead 60 is attached. In this manner, a series of contiguous, concentric beads 60 are distributed along the internal surface of pipe 14. During the welding process, the rate of delivery of the electrode 52 is being controlled by arc welder 16 and is dependent upon the current being drawn through the welding gap.

The entire configuration described has been found to produce high quality weld metal deposits with excellent penetration. The apparatus may be used to resurface the interior of any diameter hollow structure as well as apply a layer of weld material to the external surface of any pipe or shaft of constant radius.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A welding apparatus for applying contiguous, coaxial weld beads on a constant radius cylindrical surface, comprising:
    a work holding means for holding a workpiece having a constant radius cylindrical inner surface to be welded, and producing constant 360° rotation of said workpiece at a predetermined rate;
    switch means attached to said apparatus;
    cam means attached to said work holding means in operative relation to said switch means for causing one actuation of said switch means upon each 360° rotation of the workpiece in said work holding means;
    weld producing means for applying a consumable electrode to the inner surface of said workpiece in the form of weld beads as the workpiece rotates, said weld producing means comprising an elongated welding head having supply means thereon for supplying weld material to the workpiece, said welding head having a length equal to the length of said workpiece and constituting the only element other than said work holding means in communication with said workpiece;
    carriage means mounting said welding means for advancing said welding head axially of said workpiece; and
    control means operatively connected to said switch means and said carriage means for causing said carriage means to incrementally advance by a predetermined distance upon each actuation of said switch means, said predetermined distance being substantially equivalent to the width of one weld bead.

* * * * *